Patented July 7, 1936

2,047,016

UNITED STATES PATENT OFFICE 2,047,016

ALKALI SILICATE HEAT AND SOUND INSULATING COMPOSITION

Nathaniel M. Elias, New York, N. Y.

No Drawing. Application September 26, 1930, Serial No. 484,701

7 Claims. (Cl. 106—19)

The present invention relates generally to heat insulating and sound proofing materials and more particularly constitutes an improvement over such products as disclosed in my Patent No. 1,724,185 and in my copending application Serial No. 385,463 filed on August 12, 1929.

The object of the present improvement is to provide an improved process whereby an improved heat and sound insulating product is obtained which has cells greatly reduced in size, the specific gravity of the product remaining substantially the same. The product thus obtained has greater mechanical strength and improved insulating qualities and a reduced tendency to absorb moisture and/or carbon dioxide. These objects are accomplished by the addition to the alkali silicates of a substance such as alkali borate.

The preferred embodiment of my invention consists in a sound and heat insulating material made from alkali borates and alkali silicates. Although the exact chemical constitution of the product is unknown to me, it is likely that some alkali borosilicates are present as well as alkali silicates and alkali borates.

The product sought may be obtained in a variety of forms and the method may also be varied. Essentially the raw material used is a concentrated paste, suspension or solution of alkali borates and alkali silicates or of alkali borosilicates. This paste, suspension or solution may be prepared in a variety of ways as indicated by the following examples.

Example #1

An alkali silicate, such as sodium silicate, in aqueous solution, and having a fairly high content of $Na_2O$ may be partially neutralized with boric acid.

Example #2

A borate such as commercial borax, either in finely divided form, or in solution, may be added to an alkali silicate solution. Any other borates may, of course, be employed.

Example #3

An alkali silicate may be dried to a glass like solid still containing ten to thirty per cent water or an anhydrous alkali silicate glass may be hydrated with steam and powdered borate, such as borax or boric acid, may be added to the powdered glass-like solid and mixed therewith forming a paste or suspension. This mixture may then be baked in a mold, of any form desired, to give either blocks or other more complicated shapes.

Example #4

The borate silicate mixture which may be formed as above or which may be formed by fusing compounds containing oxides B, Si and alkali and then hydrating may be dried to a glass like solid containing ten to thirty per cent water, then broken into small pieces and baked in a mold, of any form desired, to give either blocks or other more complicated shapes.

The $Na_2O$ content of the sodium silicate may be substantially the same as that set forth in my patent and application referred to, except that when boric acid is used instead of a borate the $Na_2O$ content should be sufficiently higher to neutralize the boric acid.

The materials prepared as set forth in the examples numbered 1, 2, 3 and 4 may then be treated in several ways depending upon the product desired.

Method #1

The material obtained by these examples may be placed in a mold and baked directly therein in the manner described in my patent or in my copending application.

Method #2

When the material is in the form of a solution it may be first dried to a glass-like solid and then baked either in the same apparatus or in a separate mold.

Method #3

The glass-like solid containing a substantial proportion of water may be crushed to any desired degree and then the material may be baked in a continuous furnace which is provided with agitators or which may itself be agitated so as to obtain a granular insulating material.

Method #4

When slabs or blocks are desired, the glassy mass may be baked as such in a suitable mold to give large masses of insulating material containing no binding material.

Method #5

Spray drying may be utilized. Solutions of the alkali borosilicates or mixtures of solutions of the silicates and borates may be sprayed into hot gases, such as combustion gases, thereby forming a finely divided insulating material.

Method #6

To obtain particles of glassy solid containing 10 to 35% moisture the mixed solution may be sprayed into hot gases, the temperature of which is so regulated as to produce a finely divided material still containing 10 to 35% moisture which may be subsequently molded with heat.

Method #7

Pastes or doughs made as described in my preceding examples may be formed in curved shapes and baked in suitable molds, or they may be allowed to dry sufficiently so that they may be comminuted to particles for forming pellets of the finished product on baking.

The products resulting from the methods described above may be employed in the formation of a variety of articles or materials. The granular product described above may, for example, be treated with asphalt, or an asphalt paraffin mixture, or with resins or gums, or with cellulose esters. These may then be compacted into any form desired for insulating and sound proofing purposes, and under some conditions such products may be employed without compacting.

The granular material may also be treated with cement, plaster, or any cementitious substance to form plastic masses which may be molded in any desired form.

The granular borosilicates may also be treated with a thermosetting resin, such as synthetic resins of the phenol formaldehyde type or other condensation products as synthetic resins from polyhydroxy alcohols and organic acid anhydrides resins or the like to form heat moldable plastic masses.

Where the product obtained is in block or slab form, as for example the product obtained by Methods #1, #2 or #4 so that it contains no binding material, the slabs may be water-proofed by dipping into or spraying with asphalt, asphalt emulsion, paraffin, asphalt paraffin mixtures or other waxes, gums, resins, cellulose esters, paints, varnishes, rubber solutions, rubber pastes, thermoplastic varnishes, thermoplastic pastes.

If desired the slab or blocks may be wrapped in paper or cloth or other coating which may be waterproof, or it may be either reinforced or completely encased in hard or soft rubber, artificial resin or sheets thereof, celluloid-ester compositions or celluloid sheets or sheet metal which may be arranged in such units as to be easily joined to one another or to any other structural units either by bolting or, in the case of metal, welding or other similar means, or it may be dipped into or sprayed with molten metal to coat it, either partially or completely or it may be coated with a glaze to give a tile-like finish. Blocks formed of this material may be reinforced by perforated metal or metal screens on the surface or they may be coated with a cementitious mass such as cements, plaster, etc., to provide reinforcing and a suitable finish.

Where the granular material or the material in block form is treated with thermosetting substances such as the artificial resins mentioned hereinabove or the raw rubber-sulphur paste suitable for making hard rubber on heating, the resultant product may be heated to suitable temperatures under the pressure required for the particular thermosetting material used to form a durable block with a good finish which may be used with no further treatment as a structural material or as a material for cabinet work.

Such a thermosetting mass as is obtained when the granular product is used with a thermoplastic material may be used for molding entire articles in which insulation is important, such as ice box cabinets, partitions, etc.

Similarly, if blocks of the material are used, they may either be molded originally in the form of a finished article, such as any ice box cabinet, or they may be constructed from several unit blocks to form such a cabinet, which may then be coated with metal, thermosetting material, rubber, sulphur-rubber paste cellulose ester compositions, celluloid, or the like, and heated under suitable pressure in the case of the thermosetting material or sulphur-rubber paste, to give a finished cabinet or other article with hardened finished surfaces.

Structural units may be produced from the material in several ways.

1. The granular form of the substance may be incorporated in cement, plaster or similar cementitious materials and formed into whatever shapes are desired.

2. The block or slab form of the material may be coated with a cementitious material either on one or both sides. Reinforcing may be used in the cementitious material which may consist of metal screening, metal wool, shavings or fibrous material of any kind.

3. Whole structures may be formed around the new material as a core, which need not be removed being light and valuable as an insulating and sound proofing material.

Whole structures may be molded by mixing the granular form of the material with the cementitious material and molding. In the production of the new material fibrous or reinforcing material may be added to the original silicate-borate mixture before drying and baking so that when completed the fibrous material may be incorporated throughout the finished mass thus reinforcing it. This fibrous material may be any inorganic substance such as asbestos, glass wool, etc., or it may be metallic, in the form of screening or metal wools.

In the manufacture of the material, alkali silicate of any commercial variety may be used. However, the lower the ratio of $Na_2O$ to $Si_2O$ in the silicate the denser the product obtained and the less the tendency to absorb moisture.

The proportion of borate which may be added may vary through practically the entire range from a mixture containing a very small amount of borate to one containing only a small amount of silicate.

However, under present conditions of price, borates being more expensive than silicates, the proportion of borate used is usually less than that of silicate. As little as one per cent of borax, for example, has a noticeable effect on the structure of the material and ten to fifteen per cent a very markedly beneficial effect. Higher percentages improve the structure still more, and it therefore becomes a question of price and properties desired as to what particular proportion will be used for any specific purpose.

I have found it possible to make alkali-silicate or alkali-silicate-borate structural, insulating, and sound-proofing materials of highly varying apparent specific gravities by regulating the quantity of glassy material in the mold so that after baking the weight of puffed material filling the volume of the mold is such as to give any specific gravity desired from about .05 up to al-

most the actual specific gravity of the glass itself. This is accomplished by having a mold so arranged that the moisture may escape from it, but the material itself is held rigidly by the walls of the mold. The blocks, no matter what the specific gravity decided upon are always uniform cellular. The higher the specific gravity desired, the more heavily reinforced must the molds be, as the pressure generated in puffing during the escape of the moisture is very considerable.

It will be understood that where the step of baking is described hereinabove in the formation of a slab or block the process disclosed in my Patent #1,724,185 or in my application referred to hereinabove should best be followed, except insofar as the same is modified herein.

It will be understood that by the term "alkali borate-silicate" appearing in the claims appended herewith is meant the material which contains alkali borates and alkali silicates or their equivalents.

I claim:
1. A new manufacture comprising relatively insoluble masses consisting solely of substantially anhydrous cellular alkali borate-silicate.
2. A new manufacture comprising blocks consisting solely of relatively insoluble substantially anhydrous cellular alkali borate-silicate.
3. A non-crystalline relatively insoluble glassy solid consisting solely of alkali borate-silicate containing in excess of ten and up to thirty per cent moisture.
4. A structural material consisting of blocks having pellets composed solely of relatively insoluble alkali borate-silicate distributed throughout a cementitious mass.
5. The process herein described which consists in mixing alkali silicate solely with alkali borate, changing the water content of this mixture until the same shall be between ten to thirty-five per cent and the mixture becomes a glass-like solid, breaking this solid into small pieces, placing these pieces into a mold of desired form, and baking the mass to produce a shaped block of the material.
6. The process herein described, which consists in mixing a solution of alkali silicate solely with a solution of alkali borate, heating the same until the water content thereof is between ten to thirty-five per cent, and the mixture becomes a glass-like solid, breaking this solid into small pieces, placing these pieces into a mold of desired form, and baking the mass to produce a shaped block of the material.
7. A mixture consisting solely of powdered alkali borate and powdered alkali silicate, containing from ten to thirty per cent of bound water.

NATHANIEL M. ELIAS.